(12) United States Patent
Pesquet et al.

(10) Patent No.: US 11,508,254 B2
(45) Date of Patent: Nov. 22, 2022

(54) TRAINING AND/OR ASSISTANCE PLATFORM FOR AIR MANAGEMENT VIA AIR TRAFFIC MANAGEMENT ELECTRONIC SYSTEM, ASSOCIATED METHOD

(71) Applicant: THALES, Courbevoie (FR)

(72) Inventors: Béatrice Pesquet, Rungis (FR); Fateh Kaakai, Rungis (FR); Warren Beeston, Rungis (FR)

(73) Assignee: THALES, Courbevoie (FR)

( * ) Notice: Subject to any disclaimer, the term of this patent is extended or adjusted under 35 U.S.C. 154(b) by 743 days.

(21) Appl. No.: 16/449,023

(22) Filed: Jun. 21, 2019

(65) Prior Publication Data

US 2019/0392726 A1 Dec. 26, 2019

(30) Foreign Application Priority Data

Jun. 21, 2018 (FR) ...................... 18 00638

(51) Int. Cl.
*G09B 9/00* (2006.01)
*G06N 3/08* (2006.01)
*G08G 5/00* (2006.01)

(52) U.S. Cl.
CPC ............... *G09B 9/006* (2013.01); *G06N 3/08* (2013.01); *G08G 5/0017* (2013.01)

(58) Field of Classification Search
CPC .......... G09B 9/006; G09B 19/00; G09B 9/00; G06N 3/08; G06N 3/0454; G08G 5/0017;
(Continued)

(56) References Cited

U.S. PATENT DOCUMENTS

2015/0371544 A1 12/2015 Mere
2016/0275801 A1* 9/2016 Kopardekar ......... G08G 5/0082
(Continued)

FOREIGN PATENT DOCUMENTS

CN 108039067 A 5/2018
EP 1632892 A2 3/2006

OTHER PUBLICATIONS

Fabry, J. ef al., "Applications of Simulation and Artificial Intelligence Technology for ATC Training", procceedings of the IEEE, IEEE. New York, US, vol. 77, No. 11, pp. 1762-1765, Nov. 1, 1989.
(Continued)

*Primary Examiner* — Marthe Y Marc-Coleman
(74) *Attorney, Agent, or Firm* — ArentFox Schiff LLP (57) ABSTRACT

A training and/or assistance platform for air traffic management is provided. The platform includes an air traffic management electronic system for obtaining input data representative of air traffic, to deliver, to an air traffic controller, information established as a function of the obtained input data, and to receive instructions from the air traffic controller The platform further includes a block for automatically determining instructions based on input data representative of at least the state of air traffic. The platform further includes an electronic processing module for collecting said input data and to provide it to the automatic determining block The platform further includes a neural network derived from learning on an input data history obtained by an electronic air traffic control system and received air traffic control instruction(s) received by the system.

8 Claims, 3 Drawing Sheets

(58) Field of Classification Search
CPC ...... G08G 5/0013; G08G 5/26; G08G 5/0043;
G08G 5/0082; G08G 5/00; G08G 5/0095;
G08G 5/0073; G06Q 50/20
See application file for complete search history.

(56) References Cited

U.S. PATENT DOCUMENTS

2016/0314632 A1    10/2016  Bahrami et al.
2017/0291704 A1*   10/2017  Alegria ................ G08G 5/0039

OTHER PUBLICATIONS

French Search Report, from the French Patent Office in counterpart of French Application No. 1800638, dated Apr. 11, 2019.
Thaens, R. et al., "Mission-based radar optimisation via Automated Scenario Recognition", The 19th International Radar Symposium IRS 2018, German Institute of Navigation—DGON, pp. 1-10, Jun. 20, 2018.
Baomar, Haitham, et al., "Autononius Navigation and Landing of Large Jets Using Artificial Neural Networks and Learning by Imitation", 2017 IEEE Symposium on Computational Intelligence (SCCI), pp. 1-10 (2017).
European Office Action, from the European Patent Office in counterpart European Application No. 19181199.1, dated May 19, 2021.
Lopez-Leones, J., et al., "The Aircraft Intent Description Language: A key enabler for air-ground synchronization in Trajectory-Based Operations," 2007 IEEE/AIAA 26th Digital Avionics Systems Conference, pp. 1.D.4-1-1.D.4-12 (2007).
Taiwanese Office Action, from the Taiwanese Patent Office in counterpart Taiwanese Application No. 108121469, dated Jun. 30, 2022.

* cited by examiner

TRAINING AND/OR ASSISTANCE PLATFORM FOR AIR MANAGEMENT VIA AIR TRAFFIC MANAGEMENT ELECTRONIC SYSTEM, ASSOCIATED METHOD

CROSS-REFERENCE TO RELATED APPLICATIONS

This application claims priority to French Patent Application No. 18 00638, filed on Jun. 21, 2018. The disclosure of the priority application is incorporated in its entirety herein by reference.

TECHNICAL FIELD

The present invention relates to the field of electronic air traffic control systems, typically electronic air traffic management (ATM) systems. Such a system provides the interfacing between an air traffic controller on the one hand, for example responsible for a given geographical sector, and on the other hand the aircraft located within the geographical sector or other air traffic controllers, in particular those responsible for the neighboring geographical sectors.

BACKGROUND

Such a system receives data from outside systems (weather data, aircraft flight plans, radar detection, messages from air traffic controllers from neighboring sectors, etc.), processes this data, optionally combines it, etc., then retrieves, via an MMI (man-machine interface), this data or the information resulting from the processing operations for the air traffic controller. The air traffic controller, based on this data and information, determines instructions (commands intended for the aircraft, messages for the neighboring controllers including information, data, commands to execute additional functions of the system, etc.) and enters them via the MMI. The system next processes these commands.

Currently, no solution is offered making it possible for air traffic controllers to benefit from the experience acquired over time in the field of air traffic control, whether in the context of training or during operational air traffic control situations.

For example, air traffic controller training is done through test programs having a certain number of drawbacks: they offer a very limited number of scenarios, are not very upgradeable and therefore find it difficult to be representative of changes to air traffic control systems.

SUMMARY

To that end, according to a first aspect, the invention proposes a training and/or assistance platform for air management via an air traffic management electronic system, said training platform including:

said air traffic management electronic system, adapted for obtaining input data representative at least of the state of air traffic, to deliver, to the air traffic controller operating the system, information relative to the air traffic and established as a function at least of said obtained input data, to receive, from an air traffic controller, instructions as a function of said delivered information and to process said instructions;

a block for automatically determining instructions based on input data representative of at least the state of air traffic;

an electronic processing module adapted for collecting said input data obtained by the electronic air traffic control system, to provide it to the automatic determining block, to collect at least an instruction determined automatically based on said provided input data and to command the delivery of said instruction to the air traffic controller operating the system;

and said block includes a neural network derived from learning carried out by computer, based on sets of elements of a first history of sets of elements, each set of elements being associated with a respective aerial situation corresponding to a respective moment from among a plurality of respective moments in the history and including at least input data obtained by an electronic air traffic control system at the respective moment and the received air traffic control instruction(s) received by said system following the delivery of information established based on said input data.

The invention thus makes it possible to provide a reliable training and/or assistance platform for air traffic management, taking advantage of real situations and their variety, and which is dynamic.

In embodiments, the training and/or assistance platform for air traffic management according to the invention further includes one or more of the following features:

the platform includes a memory adapted for storing a second history of sets of elements, and the processing module is adapted for extracting input data from said database, in order to determine training input data at least based on extracted input data, and for providing said training data to the air traffic management electronic system and the automatic determining block; said air traffic management electronic system being adapted for delivering information relative to the air traffic established based on said training input data, in order to receive, from an air traffic controller training on the platform, at least one air traffic management instruction based on said delivered information and to provide it to the processing module; said processing module being adapted for comparing said received instruction with the collected automatically determined instruction and for determining a message based on said comparison, said platform being adapted for displaying the message;

the processing module is adapted for determining, based on the instruction determined automatically by the algorithmic model, a message intended to guide the air traffic controller through training toward said instruction, the platform being adapted for displaying said message;

the processing module is adapted for receiving information indicating a training theme and for extracting the input data based on said information.

According to a second aspect, the present invention proposes a training and/or assistance method for air traffic management by an air traffic management electronic system, adapted for obtaining input data representative at least of the state of air traffic, to deliver, to the air traffic controller operating the system, information relative to the air traffic and established as a function at least of said obtained input data, to receive, from an air traffic controller, instructions as a function of said delivered information and to process said instructions, said method being carried out on a training and/or assistance platform including:

said electronic system;

an automatic determination block based on input data representative of at least the state of a derived air traffic, said block including a neural network derived from learning carried out by computer, based on sets of elements of a first history of sets of elements, each set of elements being associated with a respective aerial situation corresponding to a respective moment from among a plurality of respective moments in the history and including at least input data obtained by an electronic air traffic control system at the respective moment and the received air traffic control instruction(s) received by said system following the delivery of information established based on said input data;
an electronic processing module;
said method comprising the following steps:
  obtaining input data via the air traffic management electronic system;
  by the processing module: collecting said input data and providing said collected input data to the automatic determination block;
  automatic determination by said automatic determination block based on said provided input data of at least one instruction;
  command by said processing module of the delivery of said instruction to the air traffic controller operating the system.

In embodiments, the training and/or assistance method for air traffic management according to the invention further includes one or more of the following features:
  the platform includes a memory adapted for storing a second history of sets of elements, said method comprising the following steps:
    by the processing module: extracting input data from said database; determining, based on at least the extracted input data, training input data and providing said training data to the electronic control system of the air traffic and the automatic determination block;
    by said air traffic management electronic system: delivering information relative to the air traffic established based on said training input data; receiving, from an air traffic controller training on the platform, at least one air traffic control instruction established based on said delivered information; and provision to the processing module;
    comparison by the processing module of said received instruction with the collected instruction determined automatically and determination of a message based on said comparison;
    display of the message by said platform;
  the method comprises the determination by the processing module, based on the instruction determined automatically by the algorithmic model, of a message intended to guide the air traffic controller through training toward said instruction, and the display of the message by the platform;
  the method comprises the following steps, carried out by the processing module:
    receiving information indicating a training theme, and extracting input data based on said information.

BRIEF DESCRIPTION OF THE DRAWINGS

These features and advantages of the invention will appear upon reading the following description, provided solely as an example, and done in reference to the appended drawings, in which.

DETAILED DESCRIPTION

Figure 1:
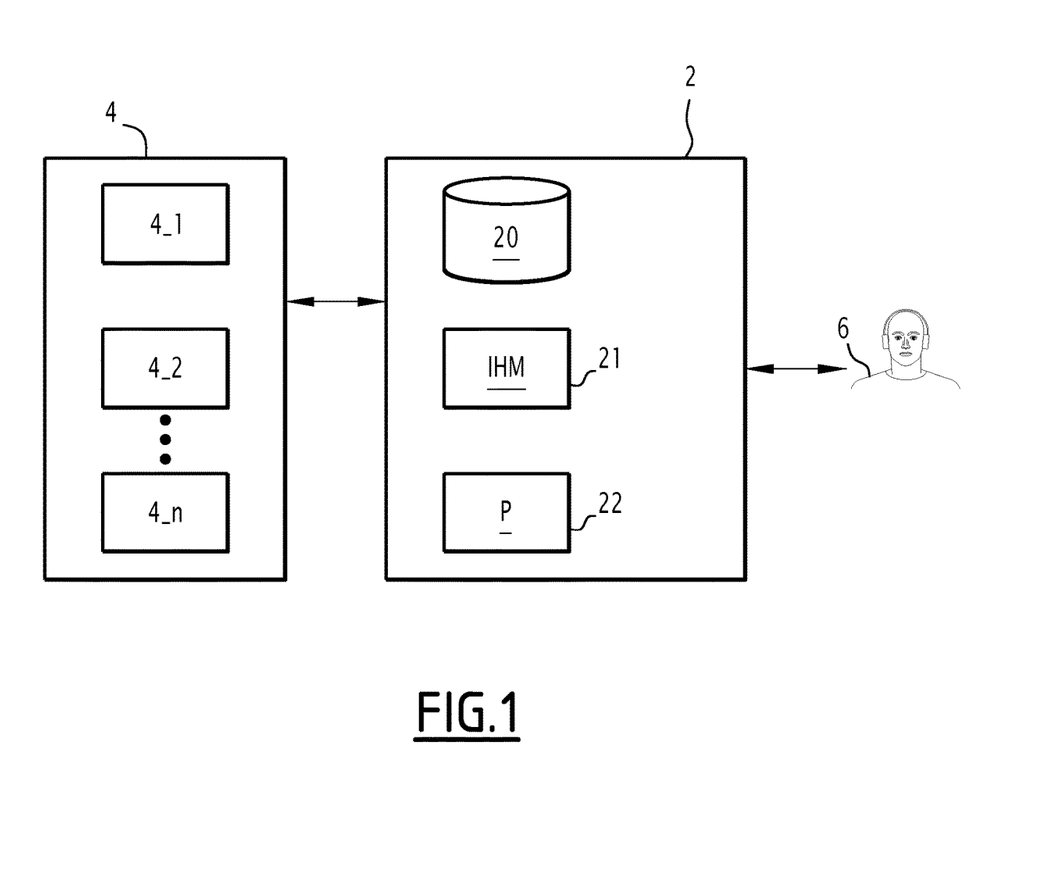
FIG. 1 shows a view of an air traffic management electronic system considered in one embodiment of the invention.

FIG. 1 shows an air traffic management electronic system 2, called ATM system 2, connected by telecommunication links to a set 4 of outside systems 4_1, 4_2, . . . , 4_n.

The ATM system 2 includes a memory 20, an MMI unit 21 and a processor 22.

The MMI unit 21 for example includes display screens, which may or may not be touch-sensitive, a speaker system, a keyboard, a microphone, etc.

The outside systems 4_1, 4_2, . . . , 4_n for example include aircraft, radars, weather stations, telecommunication devices of other air traffic controllers, airport control rooms, etc.

The ATM system 2 is adapted for receiving, and storing in its memory 20, input data (and the timestamp of such data).

This input data includes external data, i.e., which is delivered to it by the outside systems 4_1, 4_2, . . . , 4_n of the set 4; this external data represents the current or future state of the airspace (or a given sector of the airspace) for example and non-exhaustively including:
  for each aircraft currently or imminently in the sector: coordinates in 3 dimensions (3D), aircraft type, its heading, its speed, its flight plan;
  current and future weather information;
  air traffic density indicators (such as the number of airplanes in the sector, turbulence), data defining the current and future structure of the airspace (such as the presence of military no-fly zones, air corridors), current and future configuration of the airport (open runways, wind direction, available taxiways, etc.), surveillance data (as derived from primary and secondary radars, ADS-B, WAM, etc. data);
  coordination messages with air traffic controllers operating on ATM systems relative to adjacent sectors.

The ATM system 2 is further adapted for retrieving this data for the air traffic controller, via the MMI unit 21.

The external data can further be processed (for example averaged, verified, combined, analyzed, etc.) before retrieval.

The input data generally includes this processed data and its timestamp.

The ATM system 2 is further adapted for generating data internal to the ATM system 2, representative of its current state. It is in particular generated using probes installed in the ATM system 2 and for example, non-exhaustively, includes:
  a queue of messages, shared data, logs, technical layouts, a focus action on a flight tag, zoom in or zoom out factor on a given zone, voice conversation transcription between a controller and an aircraft pilot, etc.

The internal data is accessible to an operational air traffic controller operating the ATM system 2 via the MMI 21. In one embodiment, the input data stored in the memory 20 also includes this internal data, with the timestamp corresponding to said data.

In one embodiment, the ATM system 2 is adapted for implementing simple functions (such as zooming in or out on an area chosen by the air traffic controller) and more dynamic functions using the external data and generating internal data. These functions are carried out for example using computer programs implementing the function, which are stored in the memory 20 and executed on the processor 22. The dynamic functions for example include detecting conflicts, identifying a collision risk between an aircraft and another aircraft, or a risk of an aircraft entering a zone during a grounding period in the zone, etc., or determining a solution making it possible to resolve the conflict. The results of these functions are retrieved via the MMI 21, for the air traffic controller.

In a known manner, an air traffic controller operating the ATM system 2 an operational mode can thus learn, via the MMI 21, at each moment, of the current or future air traffic situation, as a function of external data and/or as a function of internal data, including the results of the upgraded functions. These data and results are provided to him via the MMI 21. Based on these elements, the air traffic controller then makes decisions that he provides to the ATM system 2 in the form of instructions via the MMI 21 (in text or visual or voice form, etc.).

These decisions include function commands of the ATM system 2 (for example commands to zoom in or out on an area displayed on the MMI block 21, and/or instructions intended for aircraft and/or ATM systems of controllers of adjacent sectors: they can thus include target flight altitude commands, target speed commands (horizontal, vertical), target heading commands, target claim or descent gradient commands, etc.

Figure 2:
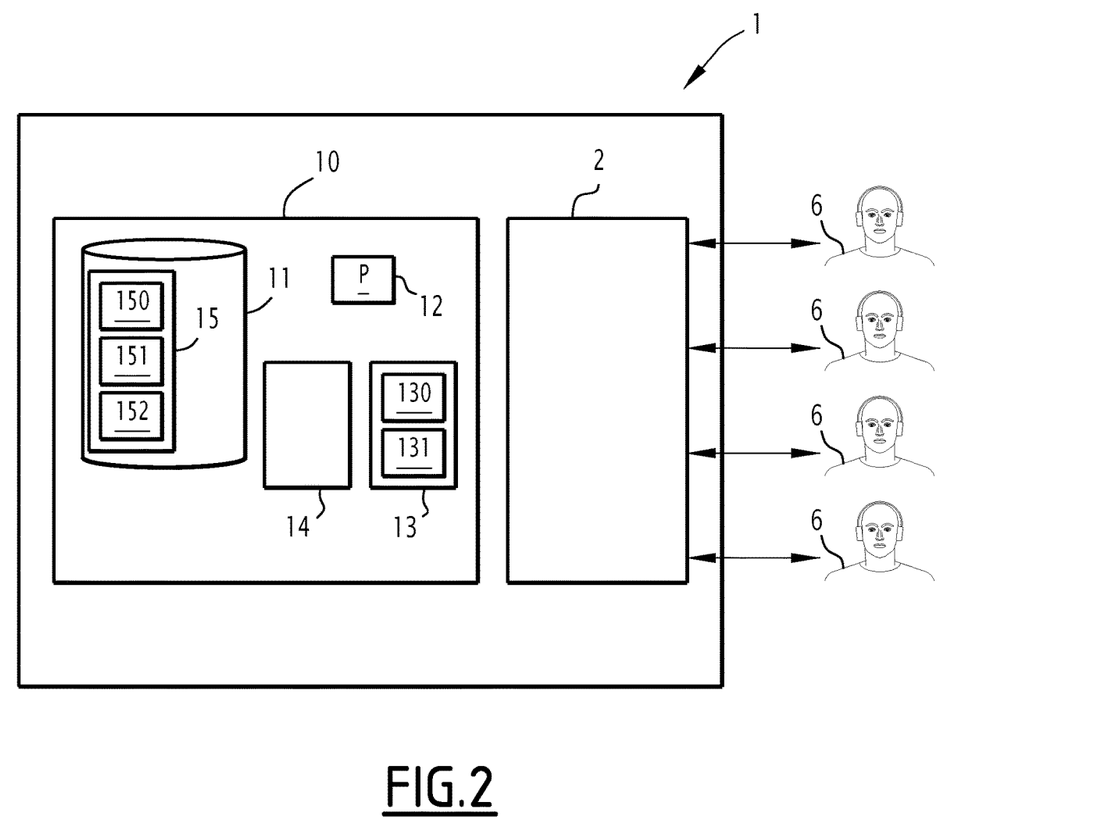
FIG. 2 shows a view of a training platform in one embodiment of the invention.

FIG. 2 shows a view of a training platform to the air traffic controller 1 in one embodiment of the invention.

This training platform for the air traffic controller 1 includes, in the considered case, a training system 10 and an ATM system 2 operating as described above and which here is used this time, not in traditional operational use, but to train air traffic controllers.

The training system 10 includes a memory 11, a processor 12, a processing module 13 and an electronic block for automatically determining instructions 14, in the present case, a neural network derived from learning, as described later.

The memory 11 includes a history 15 of element sets. Each element set includes an input element. Each input element describes an aerial situation having taken place at a given moment in the history and includes external data of the ATM systems defining this aerial situation, and includes, in embodiments, internal data of ATM systems and/or results of functions implemented by ATM systems. Each set of elements includes, associated with the input element, an output element including the instruction(s) provided to the ATM system by the air traffic controllers in light of this respective input element at the given moment.

This history is for example made from the collection over several months, from the ATM system 2, or another ATM system similar to the ATM system 2 or from several operational ATM systems, of all of these elements and their storage.

The processing module 13 includes a scenario generator block 130 and a virtual assistant block 131.

The scenario generator block 130 is adapted for selecting at least one set of elements, in order to determine, based on the input element(s) of the set of selected element(s) of a training scenario, i.e., training input data including external input data, or even associated internal input data and to provide them to the ATM system 2 in the neural network 14 of the platform 1.

The virtual assistant block 131 is adapted for collecting a decision provided to the ATM system 2 by the controller undergoing training and collecting a decision provided by the neural network 14, following the provision of the same training input data to the ATM system 2 and to the neural network 14, in order to compare them, in order to determine a message based on said comparison.

Figure 4:
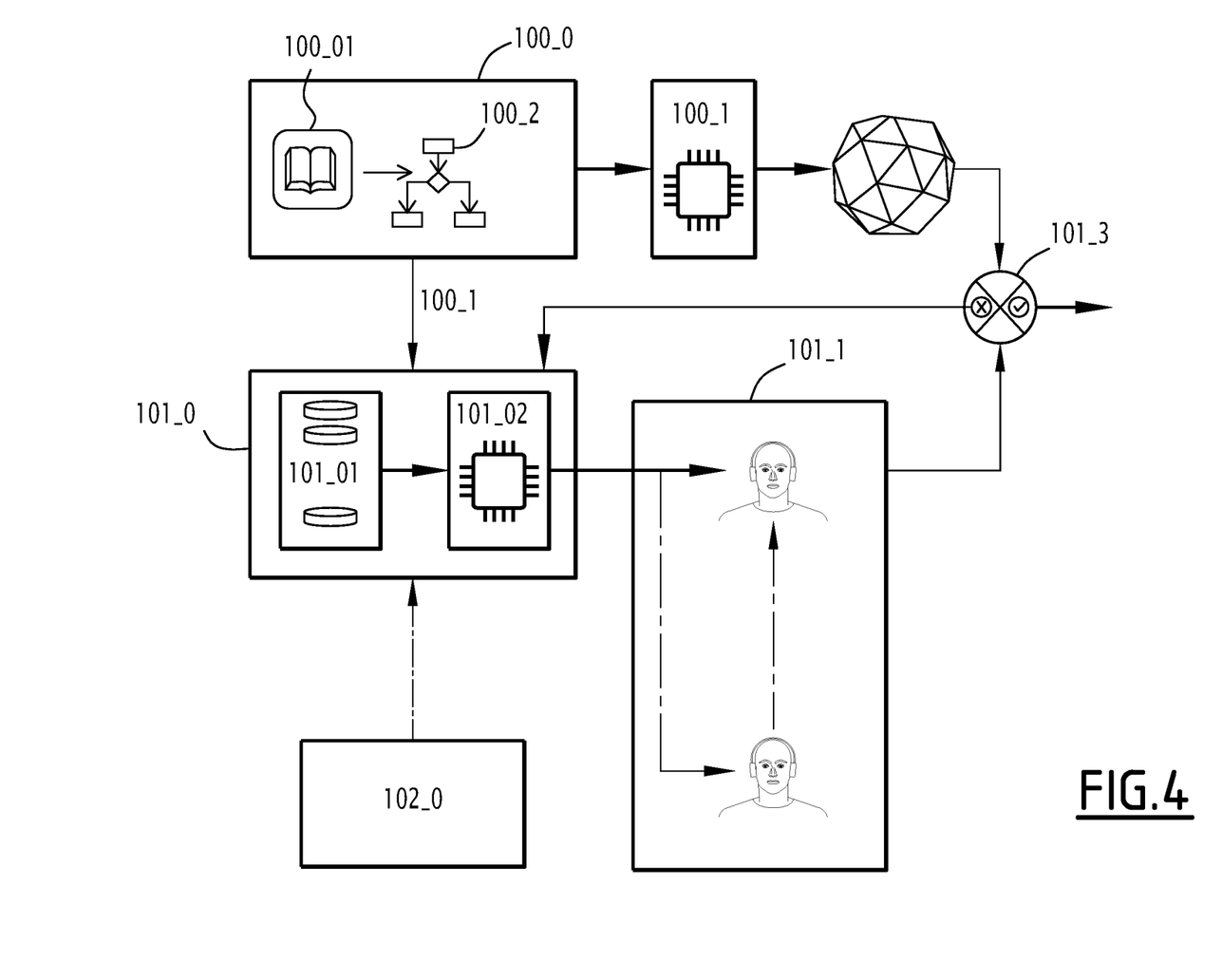
FIG. 4 is a flowchart of steps implemented in one embodiment of the invention.

FIG. 4 is a flowchart of steps implemented in one embodiment of the invention, in order to obtain the neural network 14 after learning.

In a preliminary phase 101_0 for obtaining a programmed neural network, learning is carried out, by the neural network 14, of the behavior of the air traffic controller(s), from a history of input elements including external data of the ATM systems, and including, in embodiments, internal data of the ATM systems and/or results of functions, and from a history of output elements including the decisions provided to the ATM systems by the air traffic controllers in light of these respective input elements. This history is for example the history 15, or an excerpt from the history 15.

It will be noted that this preliminary phase 101_0 for learning of the neural network 14, according to the embodiments is carried out on the platform 1, or is carried out on a specific neural network learning platform (not shown), equipped with its own memory and computing resources.

In one embodiment, the preliminary phase 101_0 includes a preparation phase 101_01 for the input and output elements identifying which are (the extracts of) those of the input and output elements useful for the learning of the neural network, in the decision-making, as well as for example the minimum duration of the history.

In a known manner, the preparation of these elements can include the segmentation of the collected elements, the detection of missing elements and operations, the reduction of the dimensions of the elements, the extraction of groups, the identification of causes and relationships, and to finish, the definition of a set of learning elements including input learning elements and associated output elements. For each test configuration, the preliminary phase 101_0 includes a learning phase 101_02 strictly speaking for the neural network 14 from input and output learning elements associated with the set of learning elements. A "learned" neural network is thus determined.

These principles of the definition of sets of learning data and use of neural networks are well known, cf. for example:

Tolk, A. (2015, July). The next generation of modeling & simulation: integrating big data and deep learning. In Proceedings of the Conference on Summer Computer Simulation (pp. 1-8). Society for Computer Simulation International;

Akerkar, R. (2014). Analytics on Big Aviation Data: Turning Data into Insights. IJCSA, 11(3), 116-127;

Boci, E., & Thistlethwaite, S. (2015, April). A novel big data architecture in support of ADS-B data analytic. In Integrated Communication, Navigation, and Surveillance Conference (ICNS), 2015 (pp. C1-1). IEEE;

Bengio, Y. (2009). Learning deep architectures for AI. Foundations and Trends® in Machine Learning, 2(1), 1-127.

The result of the learning phase 101_02 is the delivery 101_1 of a trained neural network 14, also called instruction automatic determination electronic block 14.

Any type of artificial neural networks can be used. For example, a deep learning network, a convolutional neural network (CNN) are used. The number of input nodes will be chosen to be equal to the number of input elements and the number of output nodes will be chosen to be equal to the number of output elements for each test configuration.

An ATM system 2 evolving regularly, the updates, both functional (introduction of new functions or modified functions) and technical (changes of hardware, operating system, etc.), are to be taken into account in the model 14. In such a situation, in one embodiment, the neural network 14 corresponding to the ATM system 2 before update is completed to account for these updates. Thus in reference to FIG. 4, in a step 102_0, input elements including external data of the ATM systems, or even internal data of the ATM systems, and including output elements including the decisions made by the air traffic controllers in light of these respective input elements, are recorded and stored during validation sessions done by air traffic controllers on the ATM system 2. The step 101_0 for obtaining a programmed neural network is then carried out based on these input and output elements, and leads to the delivery of an air traffic network controller model targeted on the part of the ATM system 2 that is updated. In step 101_1, a combination of the algorithmic model corresponding to the ATM system 2 before update and the algorithmic model of the ATM system 2 targeted on the updated aspects is done (for example, in embodiments, by a concatenation), thus making it possible to deliver a complete algorithmic model corresponding to the updated ATM system 2.

Furthermore, in one embodiment, in a securing step 100_0, rules, principles, constraints, conditions and prohibitions implemented by the air traffic controllers in the application of their trade (for example corresponding to the ICAO standards as defined in document 4444) are formalized in algorithmic form.

For example, these rules include that:
- a1/ an air traffic controller cannot provide commands regarding aircraft outside the sector for which it is responsible,
- a2/ except for certain exceptions specifically defined by the conditions Cond1, Cond2, Cond3;
- a3/ in a given situation corresponding to a given aircraft speed and altitude, a commanded change in flight level altitude must be below a given threshold depending on said speed and altitudes.

The resulting securing algorithm is, in one embodiment, implemented in a step 100_1 on the input and output learning elements associated with the set of learning elements prior to the building of an air traffic controller model, which makes it possible to detect the elements not conforming to the standardized practice, and next either to eliminate them from the set of learning elements, or to assign them to a "bad practice" class allowing the model to better learn the behavior of the controller according to a "good practice".

In one embodiment, in a step 100_1, these rules, principles, constraints, conditions and prohibitions implemented by the air traffic controllers in the application of their trade are also provided as learning data to an artificial neural network and, at the end of the learning phase, a model encompassing these rules is delivered, hereinafter called securing model.

Figure 3:
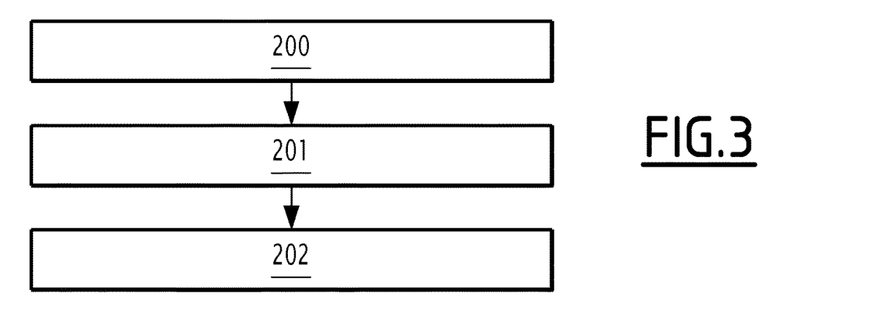
FIG. 3 is a flowchart of steps implemented in one embodiment of the invention.

In a step 101_3, each decision next made by the controller model 14 during a learning process as illustrated in FIG. 3 is provided to this securing model, which either validates the decision as conforming to good practices (in particular validates that it is in the acceptable dynamic range for the output decisions), or invalidates the decision, which is then not taken into account in the context of tests and for example then enriches the class of "bad practice", which results in reinforcing the air traffic controller model.

In one embodiment of the invention, the steps, illustrated in FIG. 3, for carrying out training of an air traffic controller using the learning form phase 1 are carried out.

In a preliminary step for choosing a learning scenario 200, the scenario generator block 130 selects at least one input element from the set of elements and determines, based on the selected element(s), a learning scenario, i.e., learning input data including external input data, or even internal input data, and it provides them to the ATM system 2 of the platform 1 and to the neural network 14 of the platform 1.

This selection can take several forms. For example, the choice can be random, or can be increasing or decreasing depending on the corresponding moment of the occurrence of the aerial situation described by the input element.

In one embodiment, a trainer provides a keyword to the learning system 10, via a man-machine interface block (not shown) of the system 10. The keyword can for example be a desired training theme, such as "conflict between airplanes", "heavy traffic", etc. The scenario generator block 130 is adapted for identifying the sets of elements whereof the input elements and/or the output elements correspond to said keyword and for selecting the input element(s) of these identified sets of elements.

In a step 201 for determining the training scenario, the scenario generator block 130 determines a training scenario based on at least the selected input element.

For example, when several input elements have been selected, each one is processed independently, as a part of the scenario, or a single one is ultimately selected, after designation by the trainer from among the set of selected input elements or a selection by the scenario generator block 130 based on predefined criteria; or a combination of several input elements is done by the scenario generator block 130 in order to obtain a single input element (by averaging, interpolation, etc.).

Then, for example, each selected input element is processed by the scenario generator 130. For example, an extraction step is carried out where only some of the parameters of the input element, in particular related to the selection theme if applicable, are kept.

A conversion step is for example carried out, in order to bring the data format into compliance with the formats accepted by the ATM system 2. The learning input data thus processed (for example in the form of data vectors including, in one case, the position of an airplane, its speed, its direction, the weather, the messages sent by the other sectors, etc.) are then provided as learning scenario to the ATM system 2 of the platform 1 and to the neural network 14 of the platform 1.

In a step 202 for training of an air traffic controller on the platform 1, the ATM system 2 receives the learning input data provided by the scenario generator 130. It is optionally processed, then the internal data received, optionally processed, is retrieved via the MMI 21, for the air traffic controller being trained.

The neural network 14 automatically determines, based on the learning input data, the corresponding output data, i.e., one or several instructions intended for the ATM 2 and provides them to the processing module 13. These instructions represent the fruit of the experience of air traffic controllers pooled within the neural network 14.

In one embodiment, the virtual assistant block 131 is adapted for determining, based on output data provided by the neural network 14, content intended to guide the air traffic controller so that he determines this output data. This content for example includes advice on the points of the learning input data to which he should pay attention, or to propose a choice of several alternative lots of instructions among which the lot of instruction provided by the neural network appears. In such a case, the virtual assistant block 131 next commands that the content be retrieved for the air traffic controller, for example by display on a screen of the MMI 21, or any other screen with which the platform 1 is equipped and which is visible by the air traffic controller.

The air traffic controller training on the platform 1, in light of the learning internal data delivered to him by the MMI 21, completed if applicable by additional content coming from the virtual assistant block 131, then makes the decision and provides it as instruction(s) to the ATM system 2 via the MMI block 21: for example, in case of training theme relative to conflicts between airplanes, flight level change commands for at least one aircraft.

The ATM system 2 of the platform 1 then sends this or these instruction(s) to the processing block 13.

The virtual assistant block 131 then makes a comparison between the instruction provided by the ATM system and coming from the air traffic controller and that provided by the neural network 14 (or the instructions between them when there are several), then it determines the content of the message based on this comparison.

This message for example indicates whether the instruction provided by the air traffic controller is correct (if it corresponds to that provided by the neural network 14) or incorrect, and the virtual assistant block then commands the display of this message on the platform 1 for the air traffic controller. If the response is incorrect, the message can further include additional information to guide the behavior of the controller toward the instruction to be determined.

In one embodiment, the virtual assistant block 131 performs, at the end of the training of the air traffic controller, a summary of the "correct instructions" provided by the air traffic controller and for example calculates his training score.

A training platform according to the invention like the platform 1 contributes to a targeted and dynamic training of air traffic controllers, benefiting from the capitalization and pooling of the considered history.

In the considered embodiment, the neural network 14 and the processing module 13 are made in the form of algorithms including software instructions stored in the memory 11 and executed on the processor 12. When they are executed, these instructions lead to the implementation of the steps described above as falling to the neural network 14, respectively to the processing module 13.

In another embodiment, the processing module 13 is made in the form of a programmable logic component, such as an FPGA (Field Programmable Gate Array), or in the form of a dedicated integrated circuit, such as an ASIC (Application Specific Integrated Circuit), and/or the neural network 14 is made in the form of a programmable logic component, such as a GPU or multi-GPU (Graphics Processing Unit) card.

The invention has been described above in the case of the training field. It also has applications in the field of assistance for air traffic controllers in operational use.

In such an application, the ATM system 2 as shown in FIG. 2 is completed by an assistance system similar to the training system 10, except that it has no history 15 in its memory. This assistance system includes a memory, a processor, an instruction automatic determination block similar in all points to the block 14 and, in place of the processing module 13, a processing module, hereinafter called assistance module. The assistance module is adapted for collecting current input data of the ATM system 2, to provide it as input to the instruction automatic determination block, to collect the instruction delivered as output by this instruction automatic determination block based on current input data and to command the provision to the air traffic controller operating the ATM system 2, for example by display on a display screen of the ATM system 2 or on an additional screen, visible by the air traffic controller. Thus, when the air traffic controller becomes aware of the state of the air traffic corresponding to the current input data as retrieved on the MMI 21, he further has determined instruction(s) as resulting from the practice learned via the neural network of the instruction automatic determination block and is able to make his own decision regarding the instruction to be entered on the MMI 21 by benefiting from this additional expertise.

The steps are then the following, in the operational phase:

The ATM system 2 of FIG. 1 receives external input data, generates internal input data. It stores them in its memory 20 and provides them, optionally after certain additional processing, to the air traffic controller via the MMI 21.

In parallel, the module collects the current input data from the ATM system 2, provides it as input for the instruction automatic determination block, obtains the delivered instruction as output by the latter and commands the provision thereof to the air traffic controller operating the ATM system 2, for example by display on a display screen of the ATM system 2 or on an additional screen, visible by the air traffic controller. The air traffic controller becomes aware of the state of the air traffic corresponding to the current input data as retrieved on the MMI 21, and further has determined instruction(s) as resulting from the practice learned via the neural network of the instruction automatic determination block. He makes his own decision regarding the instruction by benefiting from this additional expertise and enters it on the MMI 21. The ATM system 2 then processes this instruction, by performing the function of the system if such a function is commanded in the instruction, or by sending the instruction by telecommunication, to an aircraft or to the ATM system of another concerned sector.

The invention claimed is:

1. A training and/or assistance platform for air management via an air traffic management electronic system adapted for being operated by an air traffic controller, said training platform including:
   a memory; and
   a processor coupled to the memory and configured to:
   obtain input data representative at least of a state of air traffic, to deliver, to the air traffic controller operating the system, information relative to the air traffic and established as a function at least of said obtained input data, to receive, from an air traffic controller, instructions as a function of said delivered information and to process said instructions;
   automatically determine instructions based on input data representative of at least the state of air traffic;
   collect said input data obtained by the electronic air traffic control system, and to collect at least an instruction determined automatically based on said provided input data and to command the delivery of said instruction to the air traffic controller operating the system;
   further comprising a neural network derived from learning carried out by a computer, based on sets of elements of a first history of sets of elements, each set of elements being associated with a respective aerial situation corresponding to a respective moment from among a plurality of respective moments in the history and including at least input data obtained by an electronic air traffic control system at the respective moment and the received air traffic control instruction (s) received by said system following the delivery of information established based on said input data.

2. The training and/or assistance platform according to claim 1,
wherein the memory is adapted for storing a second history of sets of elements,
and wherein the processor is further configured to:
extract input data from a database, in order to determine training input data at least based on extracted input data, and for providing said training data to the air traffic management electronic system;
deliver information relative to the air traffic established based on said training input data, in order to receive, from an air traffic controller training on the platform, at least one air traffic management instruction based on said delivered information;
compare said received instruction with the collected automatically determined instruction and for determining a message based on said comparison, said platform being adapted for displaying the message.

3. The training and/or assistance platform according to claim 2, wherein the processor is further configured to receive information indicating a training theme and for extracting the input data based on said information.

4. The training and/or assistance platform according to claim 1, wherein the processor is further configured to determine, based on the instruction determined automatically by an algorithmic model, a message intended to guide the air traffic controller through training toward said instruction, the platform being adapted for displaying said message.

5. A training and/or assistance method for air traffic management by an air traffic management electronic system, adapted for obtaining input data representative at least of a state of air traffic, to deliver, to an air traffic controller operating the system, information relative to the air traffic and established as a function at least of said obtained input data, to receive, from an air traffic controller, instructions as a function of said delivered information and to process said instructions, said method being carried out on a training and/or assistance platform including:
said electronic system;
an automatic determination block based on input data representative of at least the state of a derived air traffic, said block including a neural network derived from learning carried out by computer, based on sets of elements of a first history of sets of elements, each set of elements being associated with a respective aerial situation corresponding to a respective moment from among a plurality of respective moments in the history and including at least input data obtained by an electronic air traffic control system at the respective moment and the received air traffic control instruction(s) received by said system following the delivery of information established based on said input data;
an electronic processing module;
said method comprising steps:
obtaining input data via the air traffic management electronic system;
by the processing module: collecting said input data and providing said collected input data to the automatic determination block;
automatic determination by said automatic determination block based on said provided input data of at least one instruction;
command by said processing module of the delivery of said instruction to the air traffic controller operating the system.

6. The training and/or assistance method according to claim 5, the platform including a memory adapted for storing a second history of sets of elements, said method comprising the following steps:
by the processing module: extracting input data from a database; determining, based on at least the extracted input data, training input data and providing said training data to the electronic control system of the air traffic and the automatic determination block;
by said air traffic management electronic system: delivering information relative to the air traffic established based on said training input data; receiving, from an air traffic controller training on the platform, at least one air traffic control instruction established based on said delivered information; and provision to the processing module;
comparison by the processing module of said received instruction with the collected instruction determined automatically and determination of a message based on said comparison;
display of the message by said platform.

7. The training and/or assistance method according to claim 6, comprising the following steps, carried out by the processing module:
receiving information indicating a training theme, and extracting input data based on said information.

8. The training and/or assistance method according to claim 5, comprising the determination by the processing module, based on the instruction determined automatically by an algorithmic model, of a message intended to guide the air traffic controller through training toward said instruction, and a display of the message by the platform.

* * * * *